United States Patent Office 3,106,450
Patented Oct. 8, 1963

3,106,450
PROCESS FOR THE RECOVERY OF COPPER AND VANADIUM CATALYST VALUES
Pieter J. van den Berg, Sittard, Netherlands, assignor to Stamicarbon N.V., Heerlen, Netherlands
No Drawing. Filed Aug. 10, 1959, Ser. No. 832,480
Claims priority, application Netherlands Aug. 29, 1958
3 Claims. (Cl. 23—102)

The present invention relates to the recovery of catalyst used in carrying out oxidation reactions with the aid of nitric acid.

Oxidation reactions involving the use of nitric acid are most frequently carried out in the presence of catalysts. It is known, for example (see British Patent 572,-260), that the oxidation of cyclohexanol and/or cyclohexanone into adipic acid with the aid of nitric acid can be carried out under the catalytic influence of vanadium and copper, or oxides or salts thereof.

It has previously been proposed (U.S. Patent 2,791,-566) to recover the relatively expensive catalyst from the mother liquor, after the adipic acid formed has been filtered off, by successively adding a non-volatile mineral acid to the mother liquor, evaporating the water and the nitric acid and, if necessary after addition of organic solvents, separating off the catalyst salts on a heated pressure filter.

It has also been previously proposed (British Patent 633,354) to remove nitric acid by a vacuum distillation from that part of the mother liquor that, because of the accumulation of by-products, must be eliminated from the process and subsequently, after dilution with water, to precipitate the vanadium as an organic complex by addition of a base.

These known methods both have the disadvantage that for the precipitation of the catalyst, extra chemicals, such as sulphuric acid or sodium hydroxide, are consumed. The precipitation must be followed by a filtration, which is not attractive commercially and should preferably be done with simultaneous addition of a filter aid such as kieselguhr, to improve the filterability of the catalyst residues which are relatively difficult to filter.

The principal object of the invention is to provide a process which obviates the abovementioned disadvantages. It is a special object of the invention to provide a process by which catalyst used in carrying out oxidation reactions with the aid of nitric acid, can practically quantitatively be recovered in a simple way. Further advantages and objects of the invention will be hereinafter apparent.

According to the present invention, the catalyst used in carrying out oxidation reactions with the aid of nitric acid, is separated from the mother liquid obtained after separation of the required oxidation product by distilling the liquid under reduced pressure, e.g. 20 to 200 mm. mercury pressure, to largely free the same from water and nitric acid, adding so much water during or after distillation as is needed to bring the pH of the liquid to a value between 1.5 and 6.0, then passing the liquid over an acid ion exchanger, whereby the catalyst is bound by the exchanger, and then regenerating said exchanger and removing the catalyst therefrom by passing nitric acid over said exchanger.

It will be appreciated that the pH of the liquid can always be raised to above 1.5 by adding sufficient water. An amount of water which is infinitely large compared with the amount of acid present raises the pH to 7. However, in the process of the present invention, it has been found that only small amounts of water are needed so that the process can be technically realized. If, for instance, the liquid is distilled at 50 mm. mercury pressure, continued up to a top temperature of 110° C. and steam is subsequently passed through the residue, addition of a fifteenfold amount of water yields a liquid with a pH of 2.5. It also suffices to add still smaller amounts of water, this being desirable if the organic by-products are to be recovered from the liquid passing over the ion exchanger. For example, if the distillation is carried out at a final pressure of about 50 mm. and to a final temperature of 130–160° C., a liquid with a pH of about 2.5 is obtained by adding only a quadruple amount of water. Obviously, this water may also be added in the form of steam. If the process is carried out in such a way that a liquid with a pH of below 1.5 or above 6.0 is obtained, exchange of catalyst ions is not satisfactorily possible.

To bind the catalyst ions, any acid ion exchanger may be used. Desirable results are obtained with sulphonated polystyrene (e.g. the products known as "Dowex 50" and "Imac C12"). Other acid ion exchangers include: sulphonated coal (e.g. the product known as "Dusarit").

By the instant process, the catalyst can be separated from the mother liquid without consumption of extra chemicals as is the case in known processes. Organic by-products present in the original liquid, such as mono- and dicarboxylic acids, pass practically completely through the ion exchanger. These by-products can be recovered from the resulting aqueous solution in any known way, e.g. by evaporation.

According to the invention, the ion exchanger is subsequently regenerated with nitric acid. For this purpose, distilled nitric acid is preferred. This yields a nitric acid solution which, apart from traces of catalyst which sometimes pass the ion exchanger as a fine precipitate, has practically the same catalyst concentration (usually 0.05 to 0.5% by weight) as the mother liquid, i.e. the nitric acid-containing liquid obtained after filtration of the desired oxidation product. Consequently, this solution may be immediately re-used for carrying out the oxidation reaction. If more than one metallic salt is used as a catalyst, e.g. a mixture of salts of copper and vanadium, these will be present moreover in the desired ratio in the nitric acid solution obtained by regeneration of the ion exchanger. Operation of the process with the aid of two ion exchangers arranged in parallel, offers the advantage that, apart from changing over from the one ion exchanger to the other, the process can be carried out continuously and without interruption.

As will be appreciated, it is not necessary for the total amount of mother liquid obtained after filtration of the desired oxidation product to be treated in the abovementioned way. If, for instance, cyclohexanol and/or cyclohexanone have been oxdized with nitric acid using copper and vanadium salts as catalysts, a large part (e.g. 50 to 95% by weight) of the liquid obtained after filtration of the adipic acid formed can be immediately re-used as such for preparing fresh amounts of adipic acid. The remainder, however, should first be freed from by-products, such as other dicarboxylic acids or monocarboxylic acids. Otherwise, the concentrations of these by-products will increase to undesirably high values. If desired, this remaining portion of the liquid may first be freed of part of the nitric acid (e.g. 60 to 90% by weight thereof) by distillation at a relatively low temperature (85–90° C. at 175 mm. mercury pressure) and the dicarboxylic acids may be removed from the distillation residue by cooling (to below about 25° C.) and filtration. The process according to the invention may then be applied to part of the reslting filtrate to prevent accumulation of mono-basic acids and other by-products.

Various modifications may be made in the process as described above. For instance, it is possible, after the distillation of nitric acid and before addition of the required amount of water, to filter the residue. By this treatment, any organic by-products that are relatively easy to filter may be recovered.

The process according to the invention may also be applied in case catalysts other than copper and vanadium, e.g. molybdenum, tungsten, chromium or nickel catalysts, are used. The process is also not restricted to the oxidation of organic alcohols or ketones and may be applied to any other catalytic oxidation reaction effected with nitric acid.

The following examples illustrate, but do not limit, the invention:

*Example I*

A liquid obtained by oxidation of cyclohexanol with nitric acid and filtration of the adipic acid formed, and containing, in addition to about 4% by weight of organic by-products, 30% by weight of nitric acid, 0.05% by weight of copper and 0.03% by weight of vanadium, is brought into a distillation apparatus, in which water and nitric acid are distilled off up to a final temperature of 150° C. at 50 mm. mercury pressure. The residue is then cooled down to about 110° C. by introducing 400% by weight of steam calculated on the weight of the residue. After being cooled to about 20° C., the solution, with a pH of 2.5, is passed over an "Imac C12" ion exchanger at a space velocity of about 20 (parts by volume of liquid per part by volume of ion exchanger per hour). The liquid leaving the ion exchanger contains practically all organic by-products present in the original liquid.

The ion exchanger is regenerated by means of the nitric acid distilled off. This gives a solution containing more than 97% of the copper and vanadium originally present. This solution contains less than 3% of the organic by-products originally present.

The regenerated ion exchanger may be re-used many times. After 30 chargings and regenerations, little, if any, pulverization is apparent.

*Example II*

The starting liquid mentioned in Example I is distilled up to a top temperature of 110° C. at a pressure of 50 mm. mercury. Next, steam of 130° C. is passed through the residue for 15 minutes to expel part of the nitric acid still present. Then a 15-fold amount of water, calculated on the weight of the dry residue, is added, which causes the formation of a practically homogeneous liquid with a pH of 2.5. Upon further processing in the manner described in Example I, the same result as that mentioned in said example was obtained.

Having described the invention, what is claimed as new is:

1. A process for the recovery of copper and vanadium values from the aqueous, nitric acid-containing liquid obtained by the oxidation of cyclohexanol with nitric acid using a catalyst comprising copper and vanadium followed by filtration of adipic acid formed in said oxidation, said process comprising the steps of distilling said liquid under reduced pressure to remove substantially all of the water and nitric acid therein; thereafter adding water to the residue to bring the pH thereof to between 1.5 and 6.0, then passing the resulting liquid over an acid ion exchanger whereby copper and vanadium values in said liquid are bound by the exchanger and removing said values from the exchanger by passing nitric acid over the exchanger.

2. The process of claim 1 wherein said ion exchanger is sulphonated polystyrene.

3. The process of claim 1 wherein the distillation is carried out at a reduced pressure of between 20 and 200 mm. mercury and a maximum temperature between about 110° C. and 160° C. and sufficient steam is added to the residue to give a pH of about 2.5.

References Cited in the file of this patent

UNITED STATES PATENTS

| | | |
|---|---|---|
| 2,184,943 | Pattock et al. | Dec. 26, 1939 |
| 2,791,566 | Jeffers | May 7, 1957 |